(12) United States Patent
Borenstein et al.

(10) Patent No.: US 8,055,543 B2
(45) Date of Patent: Nov. 8, 2011

(54) REFERENTIAL INTERFACE TO ENABLE COMMERCIAL INTERACTION BETWEEN ENTITIES

(75) Inventors: Howard Borenstein, Downsview (CA); Victor S. Chan, Thornhill (CA); Lev Mirlas, Thornhill (CA); Glen Shortliffe, Markham (CA)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 12/351,236

(22) Filed: Jan. 9, 2009

(65) Prior Publication Data

US 2009/0106091 A1    Apr. 23, 2009

Related U.S. Application Data

(63) Continuation of application No. 10/730,598, filed on Dec. 8, 2003, now Pat. No. 7,509,269.

(51) Int. Cl.
*G06G 1/12* (2006.01)
*G06Q 30/00* (2006.01)

(52) U.S. Cl. .......................................... 705/21; 705/26.1
(58) Field of Classification Search .......................... None
See application file for complete search history.

(56) References Cited

U.S. PATENT DOCUMENTS

| | | | |
|---|---|---|---|
| 4,799,156 A | 1/1989 | Shavit et al. | 705/26 |
| 5,710,887 A | 1/1998 | Chelliah et al. | 705/26 |
| 5,926,798 A | 7/1999 | Carter | 705/26 |
| 6,286,028 B1 | 9/2001 | Cohen et al. | 709/202 |
| 6,338,050 B1 | 1/2002 | Conklin et al. | 705/80 |
| 6,351,738 B1 | 2/2002 | Clark | 705/37 |
| 6,978,273 B1 | 12/2005 | Bonneau et al. | 707/102 |
| 2003/0187739 A1* | 10/2003 | Powers | 705/14 |

FOREIGN PATENT DOCUMENTS

| | | |
|---|---|---|
| WO | WO 00/23925 | 4/2000 |
| WO | WO 01/33369 | 5/2001 |
| WO | WO 01/69460 | 9/2001 |
| WO | WO03065273 | 8/2003 |

OTHER PUBLICATIONS

Distributor Contract, Sample Business Contracts, http://contracts.onecle.com/kofax/tech-data.distrib.1993.03.01.shtml.

* cited by examiner

*Primary Examiner* — Ryan Zeender
*Assistant Examiner* — Paul Danneman
(74) *Attorney, Agent, or Firm* — Winstead, P.C.

(57) ABSTRACT

A system, method and program product is provided for establishment of a referential interface between business entities such as manufacturers and distributors in a computerized marketplace. The interface allows commercial interaction between two potentially geographically and technologically disparate systems. The interface is established through definition and then deployment of a distributor profile document, interrelated with a set of referential interface terms and conditions and a referential interface business policy. The profile document has associated terms and conditions representing business rules and processes referring to the business policies which then have business logic implementations. The contract prescribes the business rules that will be followed between a manufacturer and a distributor with the business policies providing mapping to units of business logic in the implementation of the distributor. Additionally the interface allows and may require setup and customization of business policy command implementation logic specific to the desired distributor. The established interface is further customizable and extensible allowing a variety of distributors to be connected to a marketplace as required with relative ease.

28 Claims, 5 Drawing Sheets

REFERENTIAL INTERFACE TO ENABLE COMMERCIAL INTERACTION BETWEEN ENTITIES

CROSS REFERENCE TO RELATED APPLICATIONS

The present application is a continuation application of pending U.S. patent application Ser. No. 10/730,598, which was filed on Dec. 8, 2003 now U.S. Pat. No. 7,509,269, which is assigned to the assignee of the present invention. The present application claims priority benefits to U.S. patent application Ser. No. 10/730,598. U.S. patent application Ser. No. 10/730,598 claims priority under 35 U.S.C. §119(a) to Canadian Patent Application No. 2,433,957 filed Jun. 27, 2003.

TECHNICAL FIELD OF THE INVENTION

This present invention relates generally to communicating a relationship between entities such as a supplier and a commerce marketer in a computerized environment, and more particularly to a referential interface to enable commercial interaction between entities in a computerized marketplace.

BACKGROUND INFORMATION

A commerce site may offer services to its customers such as obtaining price quotations from distributors, transferring a shopping cart to a distributor or placing an order at a distributor store. The distributor may be on a remote web site or may be hosted on the same site as the manufacturer. The processes of quotation, shopping cart transfer and order transfer between the site and the distributors may vary among the different participating distributors and manufacturer. In traversing the differences, a reseller may have to log on to disparate sites, each with their own authentication systems, business processes and IT (information technology) infrastructures. Typically, each of the differing implementations of business logic at each distributor or manufacturer has to be accommodated by a unique communications means between the business entities.

In a typical manner, previous electronic commerce ("e-commerce") systems have been tailored to specific individual commerce offerings, and not particularly well suited to handling a wide variety of distributors, manufacturers and resellers. The advent of the Internet provided a widely used communications transport mechanism, but typical commerce applications had application logic and business rules and logic combined with server support. This combination caused business flexibility to be reduced due to the implementation of business logic in conjunction with application logic. Although applications may be common across business entities, differences in business rules and logic kept the systems apart and caused differing solutions to be created. Typical systems were therefore monolithic in nature, comprising all required elements in a self-contained solution. Unfortunately, this often meant unique or disparate systems of applications.

The spread of applications delivered using the just described mechanisms caused a lack of interoperability and a need for customers to logon to differing systems to handle a variety of desired products or services or for providers to maintain equivalent offerings across differing architectures to meet their customer needs.

Typical e-commerce systems included those with processing capability for business transactions between different users on the same system sharing the same marketplace. Other systems enabled transactions between suppliers and customers without dealing with the issues of communication between the various entities.

There is therefore a need to provide a more efficient means of enabling commercial interaction across or among applications and systems between suppliers and marketers of goods and services.

SUMMARY OF THE INVENTION

Aspects of the present invention provide a method, system and program product for providing a referential interface to enable commercial interaction between entities such as a supplier and a commerce marketer in a distributor and manufacturer relationship, in a computerized marketplace. This referential interface provides customizable profile mapping, which includes a plurality of stipulations. These stipulations provide a means of describing the manufacturer-distributor processes in a manner which is configurable to allow the business logic of a distributor's application to respect the configuration. This referential interface provides descriptions of functionality supported by a distributor while hiding the underlying complexity of the distributor's business logic, as implemented throughout the entire code base, from other participants in the marketplace such as resellers. Implementation of the interface typically allows a site to be written in a more generic manner than before.

In one embodiment of the present invention, there is provided a method for providing a referential interface to enable commercial interaction between entities in a computerized marketplace, the method comprising the steps of creating a profile document between a first entity and a second entity containing correspondence information for the said second entity, creating a stipulations document associated with the profile document, containing business processes to be followed in the interaction, creating a command reference document associated with the stipulations document, referencing commands representing business logic of the second entity in support of the processes, and integrating the second entity into the marketplace by deploying the profile document in the computerized marketplace to enable the commercial interaction between the first entity and the second entity.

In another embodiment of the present invention, there is provided a computer system for providing a referential interface to enable commercial interaction between entities in a computerized marketplace, the system comprising means for creating a profile document between a first entity and a second entity containing correspondence information for the second entity, means for creating a stipulations document associated with the profile document, containing business processes to be followed in the interaction, means for creating a command reference document associated with the stipulations document, referencing commands representing business logic of the second entity in support of the processes, and means for integrating the second entity into the marketplace by deploying the profile document in the computerized marketplace to enable the commercial interaction between the first entity and the second entity.

In yet another embodiment of the present invention, there is provided a program product having a computer readable medium tangibly embodying computer readable program code for instructing a computer to perform the method for providing a referential interface to enable commercial interaction between entities in a computerized marketplace, the method comprising the steps of creating a profile document between a first entity, and a second entity containing correspondence information for the second entity, creating a stipulations document associated with the profile document, containing business processes to be followed in the interaction, creating a command reference document associated with the stipulations document, referencing commands representing business logic of the second entity in support of the processes, and integrating the second entity into the marketplace by deploying the profile document in the computerized marketplace to enable the commercial interaction between the first entity and the second entity.

In yet another embodiment of the present invention, there is provided a signal bearing medium having a computer readable signal tangibly embodying computer readable program code for instructing a computer to perform the method for providing a referential interface to enable commercial interaction between entities in a computerized marketplace, the method comprising the steps of creating a profile document between a first entity and a second entity, containing correspondence information for the second entity, creating a stipulations document associated with the profile document, containing business processes to be followed in the interaction, creating a command reference document associated with the stipulations document, referencing commands representing business logic of the second entity in support of the processes, and integrating the second entity into the marketplace by deploying the profile document in the computerized marketplace to enable the commercial interaction between the first entity and the second entity.

Reference to a computerized marketplace may be used interchangeably with the term marketplace in material that follows.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

Embodiments of the invention will now be described, by way of example, with reference to the accompanying drawings, in which.

It is to be expressly understood that the description and the drawings are only for the purpose of illustration and as an aid to understanding, and are not intended as a definition of the limits of the invention.

DETAILED DESCRIPTION

In the following description, numerous specific details are set forth such as network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
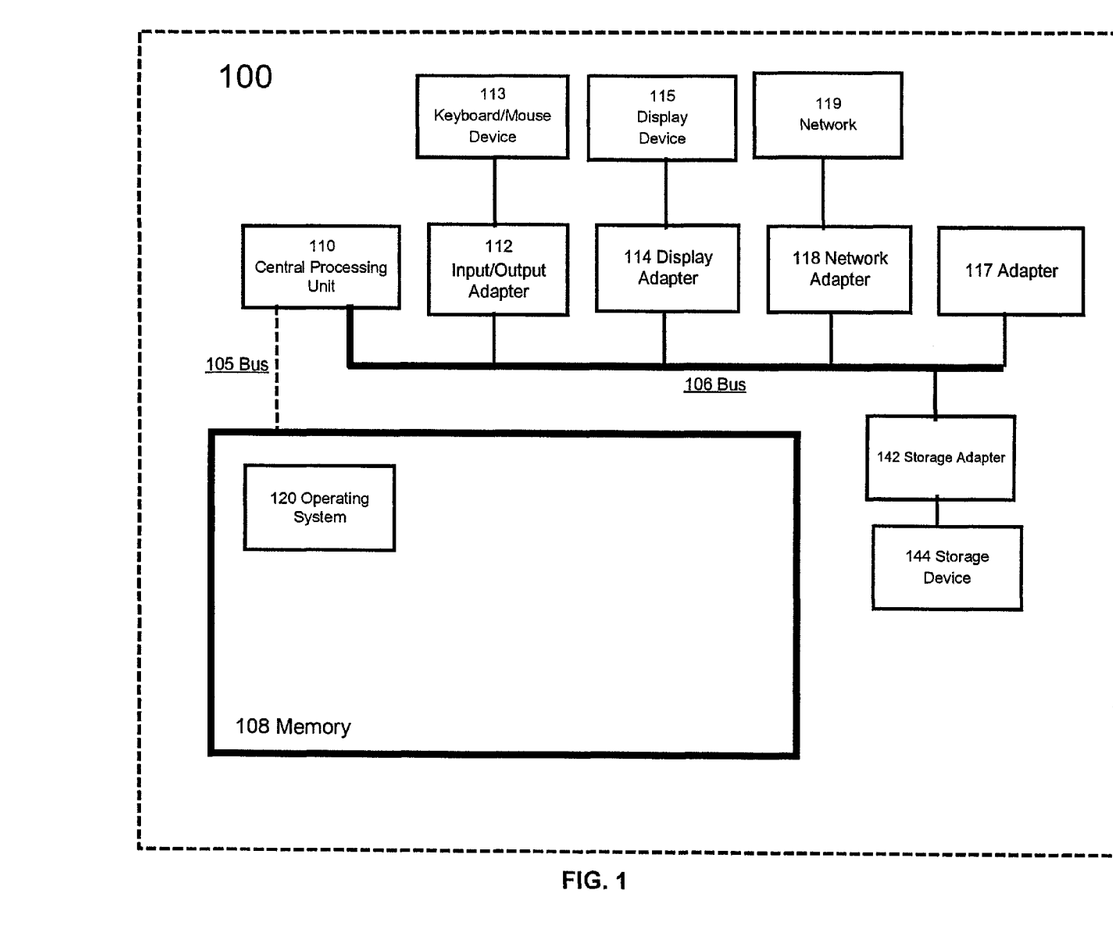
FIG. 1 is a hardware overview of a computer system in which an embodiment of the present invention may be implemented.

FIG. 1 depicts, in a simplified block diagram, a computer system 100 suitable for implementing embodiments of the present invention. Computer system 100 has processor 110, which is a programmable processor for executing programmed instructions stored in memory 108. Memory 108 can also include hard disk, tape or other storage media. While a single CPU is depicted in FIG. 1, it is understood that other forms of computer systems can be used to implement embodiments of the present invention. It is also appreciated that the present invention can be implemented in a distributed computing environment having a plurality of computers communicating via a suitable network 119.

CPU 110 is connected to memory 108 either through a dedicated system bus 105 and/or a general system bus 106. Memory 108 can be a random access semiconductor memory for storing application data for processing such as that in a database partition. Memory 108 is depicted conceptually as a single monolithic entity but it is well known that memory 108 can be arranged in a hierarchy of caches and other memory devices. FIG. 1 illustrates that operating system 120 may reside in memory 108.

Operating system 120 provides functions such as device interfaces, memory management, multiple task management, and the like as known in the art. CPU 110 can be suitably programmed to read, load, and execute instructions of operating system 120. Computer system 100 has the necessary subsystems and functional components to implement referential interface functions as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM, although other types of data storage devices can be used, including removable media.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server that can in turn be connected to the Internet. FIG. 1 is intended as an exemplary representation of computer system 100 by which embodiments of the present invention can be implemented. It is understood that in other computer systems, many variations in system configuration are possible in addition to those mentioned here. While one system has been shown it may be appreciated that many such systems may be coupled together by communication means providing a more wide spread implementation to provide a computerized marketplace yet still within the scope of the present invention.

Figure 2:
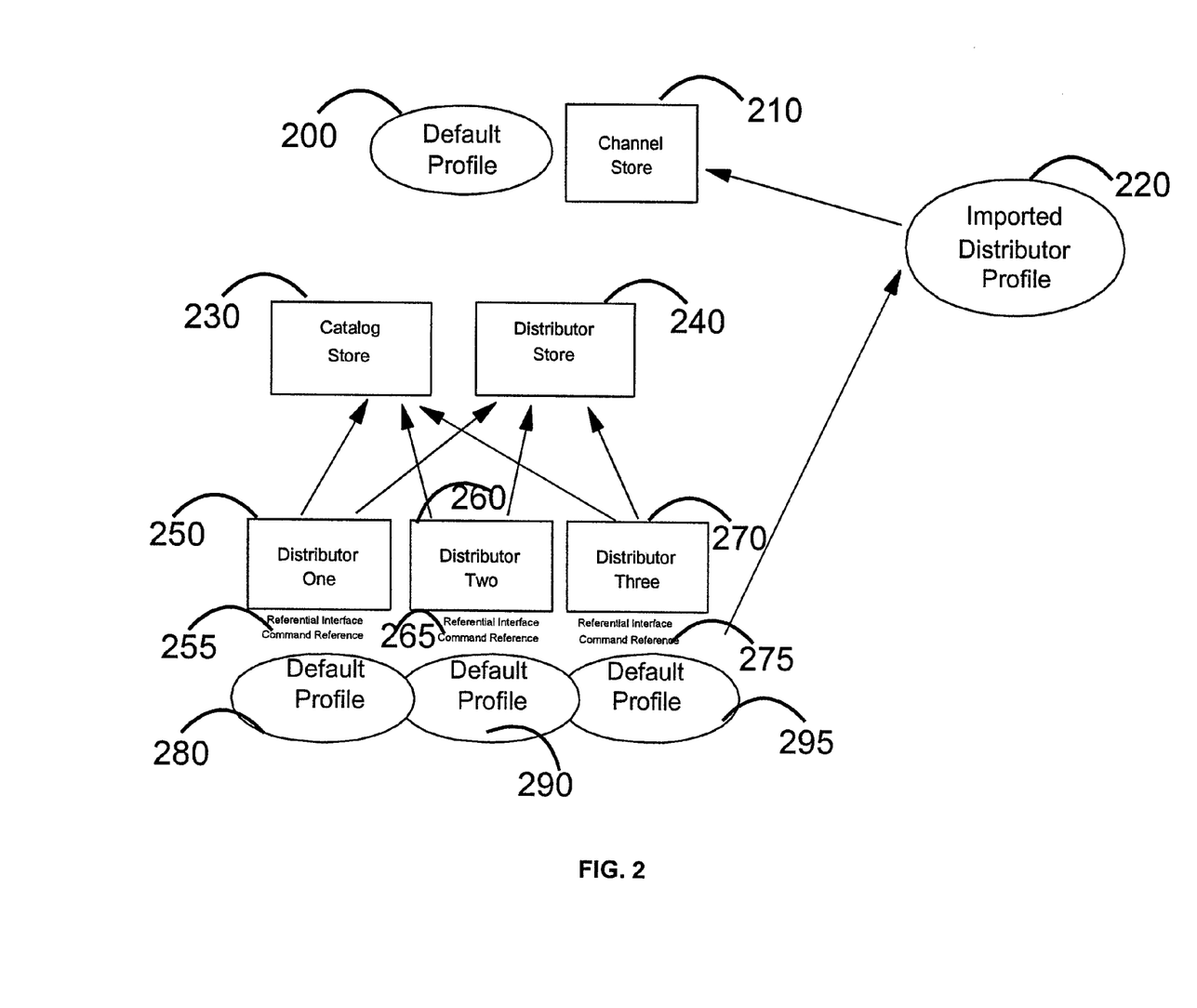
FIG. 2 depicts an example of a marketplace business model of an embodiment of the present invention.

An example of an embodiment of the invention is now presented using a marketplace business model as shown in FIG. 2. The portal makes it easier for resellers to check supply availability across a selection of distributors 250, 260 and 270, compare distributor pricing simultaneously, and order manufacturer made products through catalog profile store 230. This avoids the need for resellers to logon to disparate distributor sites, such as distributor 250, 260 and 270, each with their own authentication systems, business processes, and IT infrastructures. Resellers logon to channel store 210 to see a catalog and request quotes from distributors 250, 260 and 270. The distributor quotation process is simplified by integrating the manufacturer product information with the distributor fulfillment information into a single integrated marketplace. This centralized integration significantly increases and extends the manufacturer's knowledge of the customer selection and buying process. This allows product inventory and product manufacturing processes to be easier to manage. The manufacturer is able to minimize product inventory thereby reducing the price protection costs that it sometimes must offer to its distributors. In short, the data mining and decision support advantages of a marketplace system are extremely valuable to the manufacturer.

Embodiments of the present invention are typically found within and across systems such as computer system 100 of FIG. 1. It is likely that resellers, distributors and manufacturers are located on a variety of such systems networked together performing business transactions in a computerized marketplace.

Central to all of this functionality, is the establishment of a defined interface between the marketplace and distributor IT platforms. These distributor platforms may be completely dissimilar, thus highlighting the need to have a flexible and extensible interface such that any distributor's platform may be integrated into the computerized marketplace.

A single interface, called the "referential interface," between a first entity (a manufacturer) and a second entity (a distributor) in a computerized marketplace operating on a computer system to enable interaction between a first entity and a second entity and a means for creating it, is the means by which a remote distributor can be connected and integrated into a manufacturer's marketplace as in FIG. 2. Once the distributor has been integrated, the interface allows the computerized marketplace to communicate with the remote distributor's quotation, availability, and ordering IT infrastructure. Further, the interface is easily customizable and extensible to accommodate a distributor's particular business processes, logic, and protocols. Distributors can easily be added, removed, or reconfigured in the marketplace via manipulation of their referential interface.

The referential interface as implemented in an embodiment of the invention is an XML document known as a profile document, which is shown as imported distributor profile document 220 of FIG. 2. Saved default profile 200 under channel store 210 was created when profile document 220 was saved after importing. Customized profile document 220 was created by a marketplace administrator and then deployed onto the e-commerce platform As a result of the deployment process for each distributor, a default profile, such as that of default profile 280, 290, and 295, were established for each distributor proxy store pointing to an associated distributor profile located in channel store 210. Command reference documents 255, 265 and 275 provide reference to specific commands needed to implement specific distributor support.

The content of a profile document contains correspondence information for a particular distributor. Additionally, high level information such as a distributor organization name, a locale and a currency also may be found within the profile document.

Functionality typically supported by a distributor may include whether it supports quotation requests, shopping cart transfers, orders, orders with items on backorder, and does it require and accept user identifiers and passwords.

A distributor proxy store is created for each distributor as part of establishing a distributor relationship within the marketplace. Through the proxy store, the remote distributor functions as a local store in the marketplace. All transactions with the remote distributor store are recorded within the distributor proxy store, including such transactions as price quotes, availability, orders, order status updates and inventory updates. Each distributor proxy store implements a command reference object interface known as the referential interface providing access to integration implementation logic of the remote distributor.

A primary purpose of the interface is to hide the underlying complexity of the application and business logic of the distributor from the web pages viewed by customers. Actual implementation of the interface for a particular distributor deals with the specific commercial interaction means for the distributor but the interface itself is generic for all distributors. This structure allows the business logic of the site to be written in a generic form without exposing the underlying complexity of each distributor. Implementation specifics are then contained within well defined modules. Adding support for a new and different distributor involves implementing a custom distributor profile document for that specific distributor.

Figure 3:
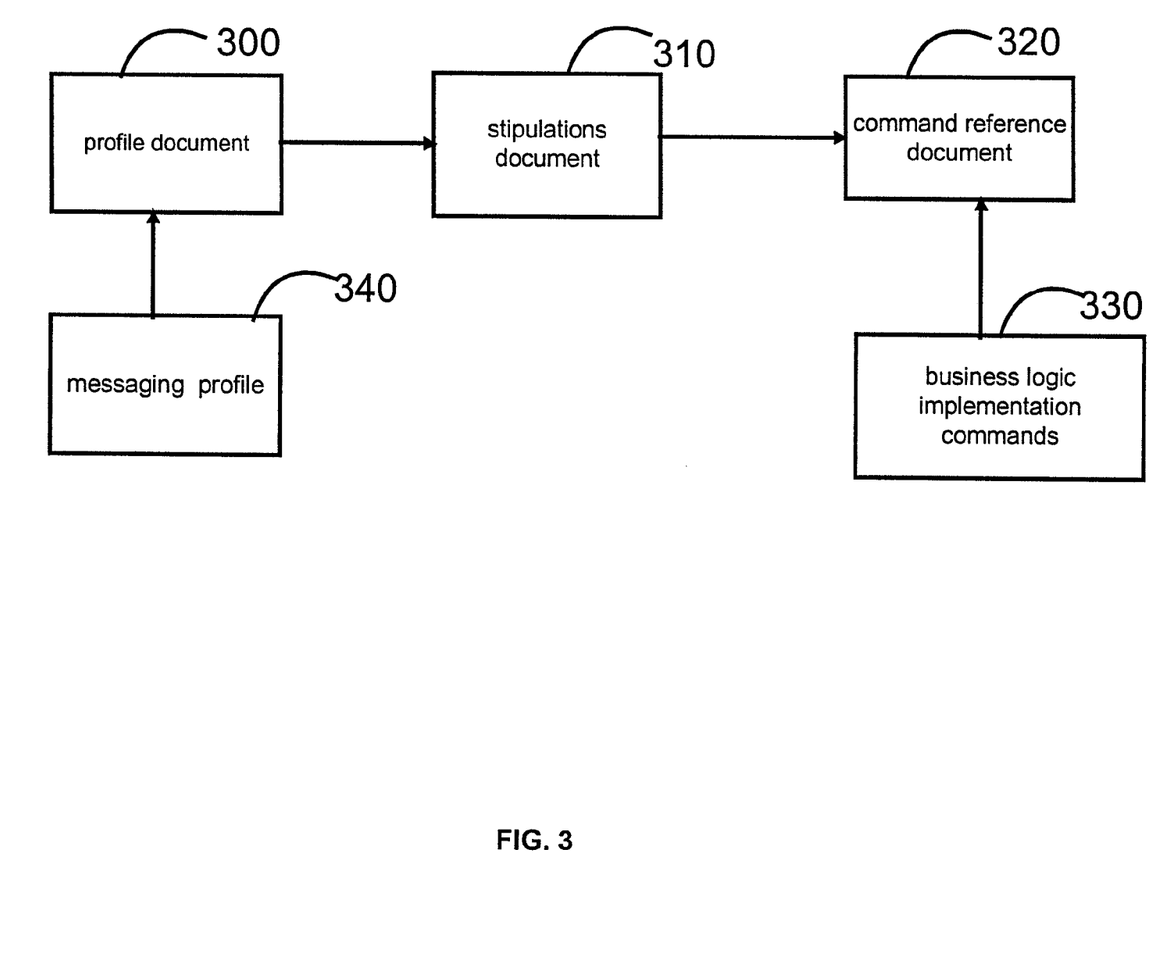
FIG. 3 is a block diagram showing a high level view of components of an embodiment of the present invention as seen FIG. 2.

FIG. 3 depicts a high level view of the relationship between the components of the referential interface model used in an embodiment of the present invention. In the model, a manufacturer provides a marketplace linking a manufacturer with resellers and distributors. Providing linkage through a referential interface allows flexibility in implementation of infrastructure for participants. Profile document 300 is an XML document created by a marketplace administrator and deployed onto the e-commerce platform. Each distributor configured in the marketplace has its own profile document tailored to suit its particular business processes, logic and protocol. As stated earlier, the profile document contains correspondence information for a particular distributor and may also contain the distributor organization name, locale and currency information. The profile document points to a stipulations document 310 which itself points to a command reference document 320. Stipulations document 310 describes the business processes to be followed by the associated distributor in a marketplace. The processes are implemented by means of commands described in command reference document 320.

Command reference document 320 refers to a set of customizable commands 330 representing the actual business logic implementation of the associated distributor. This logic is invoked by the marketplace business logic enabling commercial interaction between the marketplace and the distributor. For example, commands typically deal with business logic such as getting price and availability information, the transfer of a shopping cart (from the marketplace to a distributor), the transfer-of a completed order (from the marketplace to a distributor), getting batch availability (for inventory query) and obtaining units of measure. In addition, the commands may also handle authentication and timeout settings. It is expected that these commands implemented are customizable and extensible.

Profile document 300 also points to messaging profile 340 containing information describing which message protocols are used between the marketplace and the associated distributor. IBM® MQSeries® messaging is a typical example of a messaging protocol used between the marketplace and associated distributor.

Figure 4:
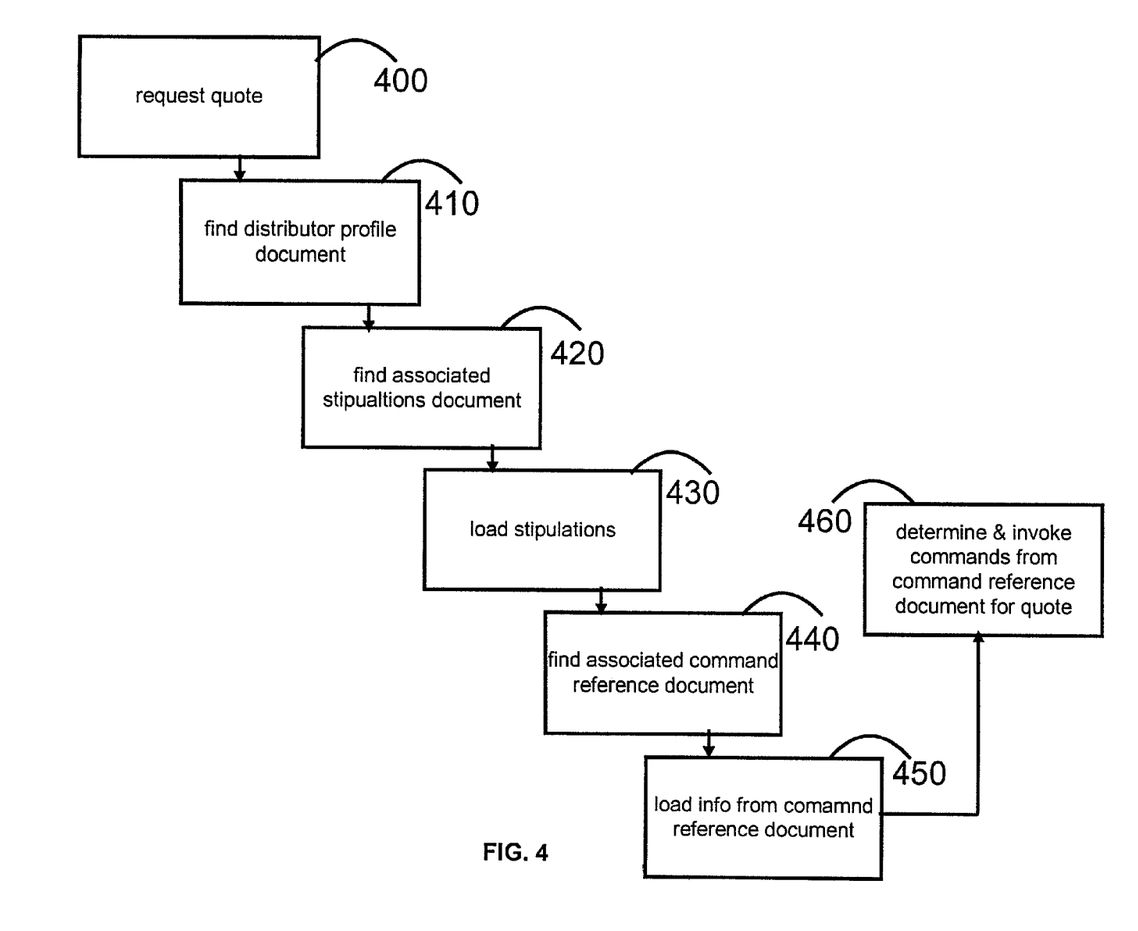
FIG. 4 is a block diagram showing a process of obtaining a quotation in an embodiment of the present invention.

FIG. 4 is a flow diagram describing the steps involved when a reseller requests a quotation from a distributor as in an embodiment of the present invention shown in FIG. 3. In operation 400, a reseller has chosen to obtain a quote from one or more distributors by submitting a request to the system During operation 410, the system locates the distributor's profile (for example, from a profile table resource) associated with that distributor's proxy store. Having found the profile document in operation 410, the process proceeds to 420 wherein the system locates the stipulations document related to the recently obtained profile document. The specific stipulations are loaded and examined in operation 430 to find the related command reference document (as defined in a command reference document table). The association between a stipulations document and command reference document may be maintained in a mapping table. During operation 440, the required command reference document is located and processing moves to operation 450 during which the command reference document information is loaded. Processing then moves to operation 460 wherein necessary commands related to the specific distributor for the desired quotation request may be invoked by the system to retrieve the desired price and availability information. In a similar manner, other requests such as a transfer of a shopping cart to a distributor may be processed. Each command found in the command reference document may have an implementation unique to a distributor based on that distributor's requirements. Such commands are self-contained blocks of code comprising low level business logic used to interact with the specific distributor (such as opening a channel of communication, transmitting a request and receiving a response as required).

The commands invoked in operation 460 can be customized or extended by additions or changes to the command reference document. Additions or changes may also require changes to the marketplace business logic to support the new interactions.

When the system loads the command reference document in operation 450, it also loads any associated property information or command interfaces. These properties specify parameters to be processed by the invoked commands. For example, a property may be a switch value used for authentication enablement as in "authentication=[true|false]". In this example, the switch setting specifies whether the reseller's credentials are to be forwarded to a distributor for use in a shopping cart transfer. If a specific distributor did not support shopping cart transfers, it would be reflected in the setting of the switch in distributor's properties settings.

Figure 5:
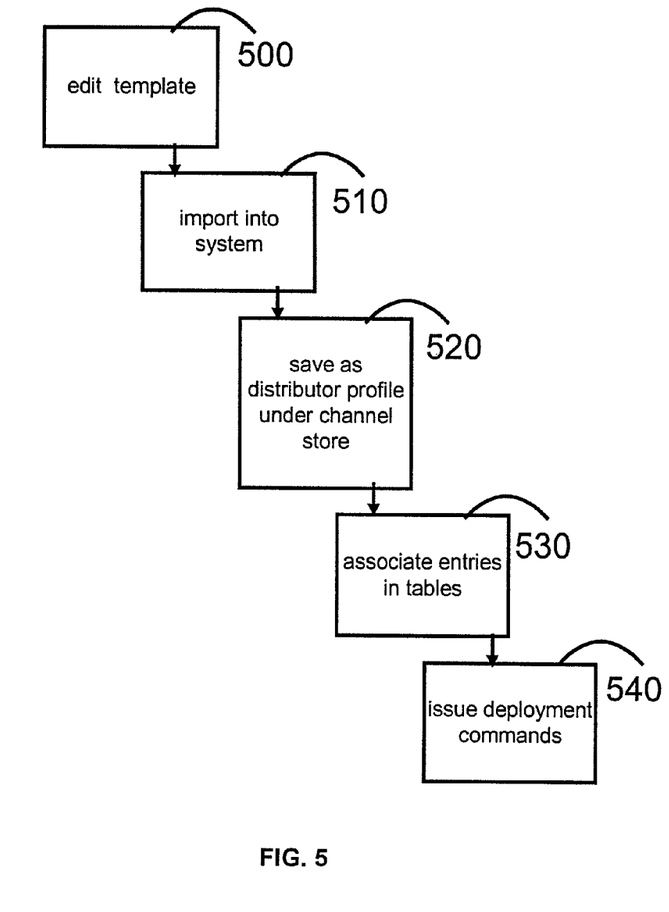
FIG. 5 is a block diagram showing a process of adding a new distributor in an embodiment as seen in FIG. 2.

FIG. 5 depicts a process for adding a new distributor to the marketplace. Beginning in operation 500, an XML template for a profile document containing correspondence information for a distributor is located and edited by an administrator in accordance with the distributor's settings. If necessary, existing parameters and command implementations are modified to handle the business processes described above (price and availability, shopping cart transfer, etc.). This customized XML profile document is then imported into the system during operation 510 and saved as a distributor profile document under the channel store during operation 520 (as seen in FIG. 2). Next, during operation 530, an association is made between this profile document and the stipulations document persisted in a stipulations document table, and a command reference document associated commands will also be created and persisted in a command reference table, as stated earlier regarding FIG. 3 and FIG. 4. As before, the command reference document and the stipulations document will be related by a mapping table for both.

A deployment command will then be processed during operation 540 to create several additional assets such as distributor proxy store and default profile. The distributor proxy store default profile will reference the distributor profile in channel store 210 of FIG. 2. Each distributor proxy store implements a command reference object interface known as the referential interface providing integration implementation logic with the remote distributor.

Although embodiments of the present invention have described a profile document, a stipulations document, and a command reference document as three separate resources, one skilled in the art can appreciate that the resources may be provided in a different combination so as to provide the same result. For example, the profile document could be expanded to consume the matter contained in either or both of the other documents. In total, the equivalent information may then be made available in a different packaging format.

In the embodiments presented, the steps of defining and deploying an instance of the interface could also have been segmented into two distinct activities. In the case of defining the interface, one skilled in the art would appreciate that a number of various versions of definitions may be prepared in advance and made ready for deployment. Actual deployment would occur at a later time, as required, to make necessary support available.

Although the present invention and its advantages have been described in detail, it should be understood that various changes, substitutions and alterations can be made herein without departing from the spirit and scope of the invention as defined by the appended claims.

What is claimed is:

1. A system, comprising:
a memory unit for storing a computer program for providing a referential interface to enable commercial interaction between entities in a computerized marketplace; and
a processor coupled to said memory unit, wherein said processor, responsive to said computer program, comprises:
circuitry for creating a profile document between a first entity and a second entity containing correspondence information for said second entity;
circuitry for creating a stipulations document associated with said profile document, containing business processes to be followed in said interaction;
circuitry for creating a command reference document associated with said stipulations document, referencing commands representing business logic of said second entity in support of said processes; and
circuitry for integrating said second entity into said marketplace by deploying said profile document in said computerized marketplace to enable said commercial interaction between said first entity and said second entity.

2. The system as recited in claim 1, wherein said circuitry for integrating further comprises circuitry for using said information from said profile document, said processes from said stipulations document and said commands referenced by said command reference document.

3. The system as recited in claim 2, wherein said first entity is a manufacturer and said second entity is a distributor.

4. The system as recited in claim 3, wherein said circuitry for integrating further comprises:
   circuitry for creating a distributor proxy store for said distributor;
   circuitry for creating a distributor proxy store default profile document associated with said distributor proxy store; and
   said distributor proxy store default profile references a profile document for said distributor in a channel store.

5. The system as recited in claim 4, wherein said referential interface is a command reference object interface implemented by said distributor proxy store.

6. The system as recited in claim 5, wherein said referential interface command reference document refers to a series of customizable commands representing a business logic implementation of said distributor.

7. The system as recited in claim 6, wherein said referential interface command reference document specifies authentication and timeout settings for said business logic implementation.

8. The system as recited in claim 7, wherein said profile document specifies a messaging profile for said distributor.

9. The system as recited in claim 8, wherein said referential interface has a property of being at least one of customizable and extensible.

10. The system as recited in claim 9, wherein said profile document is an XML based document.

11. The system as recited in claim 10, wherein manipulation of said referential interface causes an action to be performed for said distributor, said action selected from a group of add distributor, delete distributor and reconfigure distributor.

12. The system as recited in claim 1, wherein said system comprises a node within a plurality of nodes interconnected by a network allowing said first entity and said second entity to be located on differing nodes while interacting over said network.

13. The system as recited in claim 3, wherein said distributor is one of a plurality of distributors.

14. The system as recited in claim 13, wherein each said distributor has its own profile document.

15. A computer program product having a computer readable medium tangibly embodying computer readable program code for instructing a computer to perform a method for providing a referential interface to enable commercial interaction between entities in a computerized marketplace, said method comprising the program steps of:
   creating a profile document between a first entity and a second entity containing correspondence information for said second entity;
   creating a stipulations document associated with said profile document, containing business processes to be followed in said interaction;
   creating a command reference document associated with said stipulations document, referencing commands representing business logic of said second entity in support of said processes; and
   integrating said second entity into said marketplace by deploying said profile document in said computerized marketplace to enable said commercial interaction between said first entity and said second entity.

16. The computer program product as recited in claim 15, wherein said program step of integrating further comprises the program step of using said information from said profile document, said processes from said stipulations document and said commands referenced by said command reference document.

17. The computer program product as recited in claim 16, wherein said first entity is a manufacturer and said second entity is a distributor.

18. The computer program product as recited in claim 17, wherein said program step of integrating further comprises the program steps of:
   creating a distributor proxy store for said distributor;
   creating a distributor proxy store default profile document associated with said distributor proxy store; and
   said distributor proxy store default profile references a profile document for said distributor in a channel store.

19. The computer program product as recited in claim 18, wherein said referential interface is a command reference object interface implemented by said distributor proxy store.

20. The computer program product as recited in claim 19, wherein said referential interface command reference document refers to a series of customizable commands representing a business logic implementation of said distributor.

21. The computer program product as recited in claim 20, wherein said referential interface command reference document specifies authentication and timeout settings for said business logic implementation.

22. The computer program product as recited in claim 21, wherein said profile document specifies a messaging profile for said distributor.

23. The computer program product as recited in claim 22, wherein said referential interface has a property of being at least one of customizable and extensible.

24. The computer program product as recited in claim 23, wherein said profile document is an XML based document.

25. The computer program product as recited in claim 24, wherein manipulation of said referential interface causes an action to be performed for said distributor, said action selected from a group of add distributor, delete distributor and reconfigure distributor.

26. The computer program product as recited in claim 15, wherein said computer comprises a node within a plurality of nodes interconnected by a network allowing said first entity and said second entity to be located on differing nodes while interacting over said network.

27. The computer program product as recited in claim 17, wherein said distributor is one of a plurality of distributors.

28. The computer program product as recited in claim 27, wherein each said distributor has its own profile document.

* * * * *